US012585661B1

(12) United States Patent
Zhou et al.

(10) Patent No.: US 12,585,661 B1
(45) Date of Patent: Mar. 24, 2026

(54) USER ENGAGEMENT QUALITY ESTIMATION

(71) Applicant: Notion Labs, Inc., San Francisco, CA (US)

(72) Inventors: Muhua Zhou, New York, NY (US); Zachary David Smith, Brooklyn, NY (US); Jiahui Jiang, New York, NY (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 18/891,511

(22) Filed: Sep. 20, 2024

(51) Int. Cl.
*G06F 16/2457* (2019.01)
*G06F 16/9538* (2019.01)

(52) U.S. Cl.
CPC .... *G06F 16/24578* (2019.01); *G06F 16/9538* (2019.01)

(58) Field of Classification Search
CPC ............. G06F 16/24578; G06F 16/248; G06F 16/9538; G06F 16/438; G06F 16/9038; G06F 16/43; G06N 20/00
See application file for complete search history.

(56) References Cited

U.S. PATENT DOCUMENTS

| | | | | |
|---|---|---|---|---|
| 8,572,011 B1* | 10/2013 | Sculley | .................. | G06N 20/00 |
| | | | | 707/723 |
| 2009/0265290 A1* | 10/2009 | Ciaramita | ................ | G06N 3/09 |
| | | | | 706/12 |
| 2014/0280890 A1* | 9/2014 | Yi | ......................... | H04L 67/535 |
| | | | | 709/224 |
| 2016/0065429 A1* | 3/2016 | Wang | .................... | H04L 67/306 |
| | | | | 709/224 |
| 2017/0178181 A1* | 6/2017 | Liu | .................... | G06Q 30/0275 |
| 2018/0011854 A1* | 1/2018 | Yi | .......................... | G06N 20/00 |
| 2019/0286746 A1* | 9/2019 | Li | ........................ | G06F 16/9538 |
| 2023/0291959 A1* | 9/2023 | Chen | .................. | H04N 21/4882 |
| 2024/0386462 A1* | 11/2024 | Qi | ...................... | G06Q 30/0255 |
| 2025/0217418 A1* | 7/2025 | Bathwal | ............ | G06F 16/24575 |

* cited by examiner

*Primary Examiner* — Jorge A Casanova
(74) *Attorney, Agent, or Firm* — Perkins Coie LLP; Lena Petrovic

(57) ABSTRACT

The present disclosure relates to systems and methods for improved searching. In some implementations, the approaches herein can be used to rank search results to provide more relevant results to users, for example by monitoring the interactions of one or more users with pages or other items. In some implementations, the approaches herein can be used to refine and improve the performance of a search result ranking model over time.

20 Claims, 15 Drawing Sheets

510 Log user interactions

520 Prepare data to form judgment lists

530 Train model

540 Deploy model in production

910
Receive query

920
Send search request to search engine

930
Receive results from search engine

940
Re-rank top N results from search engine to create rank-ordered list of top N search results 950
Select position to insert unincluded result 960
Inject unincluded search result into rank-ordered list at selected position

USER ENGAGEMENT QUALITY ESTIMATION

BACKGROUND

Productivity platforms can be powerful tools for storing and organizing information. However, users often encounter difficulties finding information that is relevant to them. Existing approaches to finding information have significant limitations. Accordingly, there is a need for improved approaches to locating information within a productivity platform.

BRIEF DESCRIPTION OF THE DRAWINGS

Reference will now be made, by way of example, to the accompanying drawings, which show example embodiments of the present application and in which.

Figure 1:
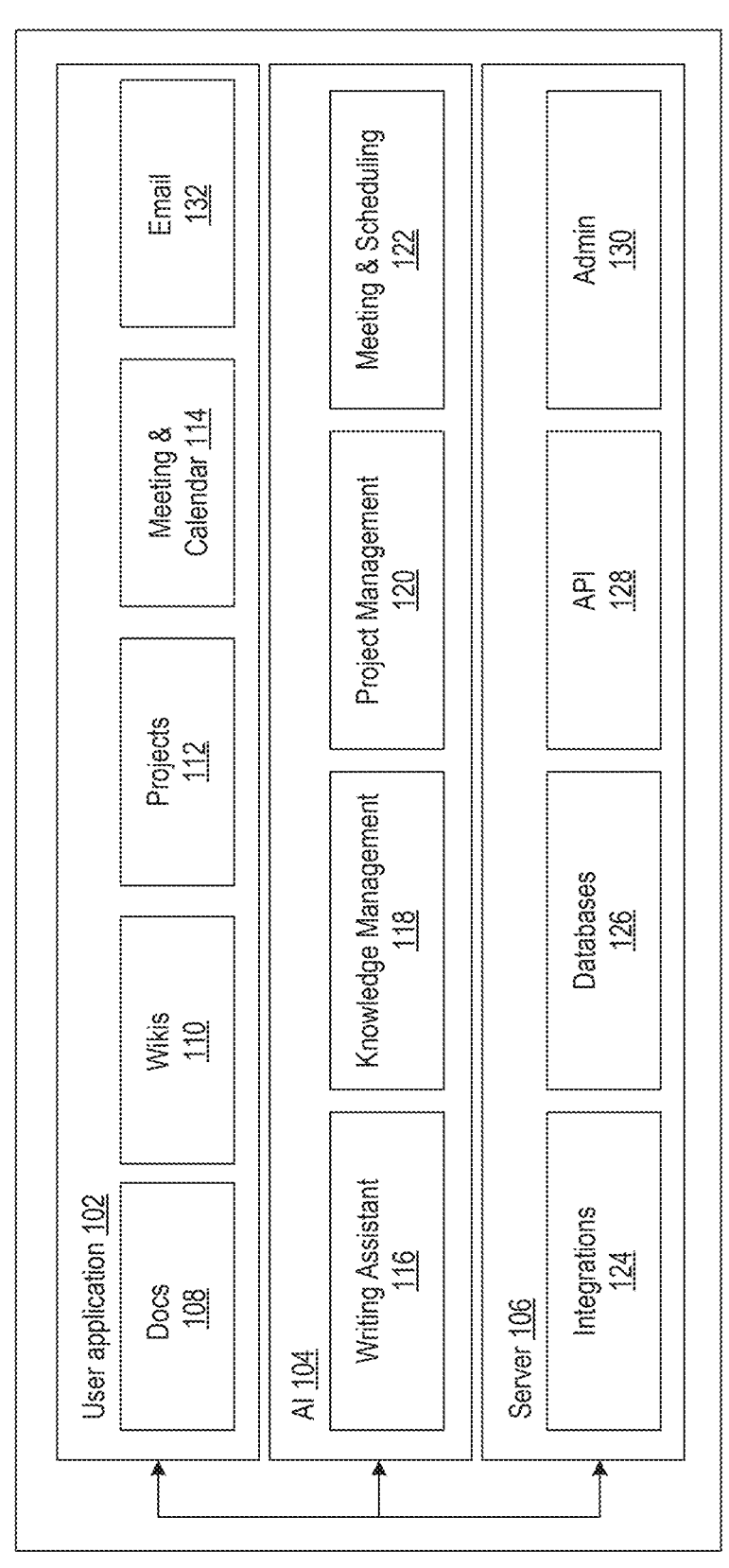
FIG. 1 is a block diagram of an example platform.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for improved approaches to identifying relevant search results among a plurality of items.

Conventional search approaches (e.g., as provided by web search engines) have limited insight into what content might be relevant to a user. A web search engine can have some information about, for example, a user's location (assuming the user is not using a VPN), a user's age range, a user's gender identity, etc., but may lack detailed information such as a user's specific role or team membership within a company, a user's specific interactions with pages, and so forth. As a result, conventional search approaches can fail to surface results that are most relevant to a user. While the result a user is looking for may be included in a set of search results, the desired result may not be a top result, making it more difficult for a user to find what they are looking for. Conventional search approaches may perform acceptably for searches where users are searching for general information but can perform poorly when used within an organization where a user may be searching for information that is specifically relevant to their role, their team, their work location, projects to which they are assigned, etc. For example, when employees are searching internal content repositories for information relevant to their job, different types of employees (e.g., those in different teams or with different roles) may be trying to locate different content despite using the same or very similar queries. For example, employees in different regions can search for vacation policies, but there may be different policies on different pages for different regions.

Individuals and organizations often use productivity platforms to track and store a wide range of information. For example, an individual or organization may use a productivity platform for ephemeral information, such as meeting notes, calendar events, and so forth, and may use the same platform to store permanent or semi-permanent information, such as workplace policies, tracking databases, knowledge bases, procedure guides, long-term project planning, financial information, and so forth. While using a single platform can offer many benefits to organizations and users (e.g., lower cost, fewer interoperability concerns, familiar user interfaces, a single source of information rather than having information scattered in various places, etc.), storing large amounts of information and/or various types of information in a single platform can present difficulties. For example, it can be difficult for users to locate desired information within the platform. Manual navigation can become difficult due to the large volume of pages. Users may rely on searching to locate information. However, as described herein, current search approaches have many deficiencies when used to find information in a productivity platform.

Search functionality can allow a user to easily find items in a personal or organizational workspace, teamspace, etc., but conventional search approaches can become unworkable for finding the most relevant items when there is a large number of items, there are many different types of items, and so forth. These problems can be especially pronounced as different kinds of users (e.g., those in different job roles) may be seeking different types of information. Current approaches have limited customization and are not well-suited to complex systems, which can lead to inefficiencies on the part of the user and the computer system executing search queries. For example, a user may waste time performing multiple searches or looking through long lists of search results if search results are not relevant, poorly sorted, etc. A computing system that executes search queries can consume significant processing power, disk activity, and so forth when a user makes multiple requests or when large numbers of results are returned to a user. If results are not well-filtered or sorted, large volumes of information may need to be transferred over a network to provide results to a user.

In some cases, search can be implemented as a simple keyword search. A simple keyword search can, in some cases, be configured to search one or more fields. Simple keyword searches can have significant limitations, however. While returned pages may include the keyword, this does not mean that the page is actually relevant to the user who made the search request. In some cases, manual boosting techniques can be used to improve results. For example, pages that were recently visited can be prioritized over pages that have not been recently visited. In some cases, pages that were recently edited can be prioritized over pages that were edited longer in the past. These and other measures for evaluating page relevancy can be performed at varying levels of granularity. For example, in some embodiments, such information can be tracked and used at a user level, at a team level, at a job role level, and/or at an organizational level.

In some cases, there can be empty or nearly empty pages in a workspace, teamspace, etc. In some cases, empty or nearly empty pages can be deprioritized relative to pages that contain more information. In some cases, a search engine can be configured to prioritize page titles over the body of the page. For example, if the user's search terms are found in a page title, that page might generally be expected to be more relevant than another page that only contains the keywords in the body of the page. In some embodiments, the relative weight given to a page title can vary. For example, if a user enters a query with at least a minimum number of words, page titles can be given greater weight than if a user enters fewer than the minimum number of words.

As the volume, variety, and complexity of data increases, it can be increasingly infeasible to use manual boosting approaches or rigid boosting rules to help identify relevant search results. Moreover, different users may benefit from different boosting, as different users may tend to view different types of information. As an example, while for many users, empty or nearly empty pages or pages with older content may generally be less relevant, a user whose job includes creating and updating pages may often be searching for pages that have limited or older content.

In some cases, human labeling can be used to help identify relevant search results. In such an approach, people perform various queries and rate the relevancy of the results that are returned. While such an approach can be somewhat effective, there are significant drawbacks. For example, such an approach can be susceptible to search bias, lack of query generalization, lack of applicability to specific users, and so forth. In some implementations, engagement mining can be used. For example, as described herein, engagement mining can analyze user engagement with pages or search results, such as how long a user viewed a particular page, whether or not the user edited a page that they clicked on, whether the user performed another similar search after viewing a page (subsequent searching), whether a user navigated back to the results (back navigation), whether a user navigated to another page (forward navigation), and so forth. In some implementations, user engagement data can be used to generate an engagement score.

According to some implementations as described herein, a machine learning model can be trained and deployed to rank and optimize the ordering of search results, which can reduce computing resources involved in searching, provide better search results to users, and so forth. In some implementations, search results can be improved based on pages recently interacted with by a user. For example, pages recently viewed by a user can be used to augment a query provided to a search engine, which can cause those pages to, if relevant, be more likely to appear in search results and/or to have a higher match score. As used herein, the term "match score" can be a score assigned by a search engine. It will be appreciated that while the match score can provide some measure of what results are relevant to a user, match scores alone can be a poor indication of the most relevant results for a particular user. Thus, results can be re-ranked using a ranking algorithm as described herein to provide improved results.

The present disclosure describes approaches for improved searching in a productivity platform. In some implementations, search results returned by a search engine can be tailored to an individual user. In some implementations, search results can be augmented, re-ranked, and so forth in order to identify and present more relevant results to a user.

In some implementations, searching can be implemented as a two-stage process: a retrieval stage and a ranking stage. In the retrieval stage, a query can be provided to a search engine, which can return search results matching the query. In some implementations, the search results can have match scores associated therewith. However, the match scores may not accurately reflect how relevant a search result is to a user. In some implementations, the number of search results that are returned in the retrieval stage can be limited. In some implementations, the number of search results can be a fixed number of results. In some implementations, the number of search results can be limited by, for example, applying a minimum match score and excluding search results below the minimum match score. During the ranking stage, search results can be re-ranked so that more relevant search results are ranked higher than less relevant search results. Described herein are approaches that can be used to improve the retrieval stage, the ranking stage, or both.

Some approaches herein relate to searching information that is organized in a hierarchy. In some implementations, a productivity platform can be implemented using a block model, for example, as described herein. Blocks can be organized in a hierarchy such that different blocks can be associated with one another. Pages can be made of one or more blocks. Pages can have various properties associated therewith, such as creation date, edit date, title, path (e.g., the relationship of the page to other pages in the hierarchy), page authority, page verification status, and so forth. Page authority can reflect, for example, user engagement with pages, who created or edited a page (page authors), and so forth. In some implementations, page authority can be based at least in part on page views. In some implementations, subsequent page views by a same user can be given less weight or otherwise be configured to have less impact, which can help prevent a single user repeatedly viewing a page from having an outsized impact on how the page is ranked in search results. Page verification status can be, for example, a page property that indicates that the page has been reviewed and the information therein verified. In some implementations, pages can be verified by humans. In some implementations, pages can be verified using an artificial intelligence or machine learning model. In some implementations, a page verification status can last indefinitely. In some implementations, a page verification status can expire after a defined amount of time.

Users can interact with pages in various ways. For example, in some implementations, users can view pages, edit pages (e.g., edit blocks, rearrange blocks, add blocks, remove blocks, change a page title, move a page to a different location within a hierarchy, etc.), comment on pages, and so forth.

While some implementations can relate to searching information that is arranged in such a hierarchical fashion, the approaches described herein are not necessarily limited to such arrangements.

In some implementations, pages can be organized into workspaces, teamspaces, or both. Teamspaces can be spaces within a workspace that store information for specific teams. A workspace or teamspace can be shared with an entire organization, with members of a particular team, and so forth. In some cases, users can be associated with one or more teams (also referred to herein as "groups") and can have access to one or more teamspaces, for example, based on their membership in one or more teams. For example, a front-end developer may be a member of the "Front-End Developers" team, the "All Developers" team, and the "All Employees" team and may have access to different teamspaces based on this membership.

In some implementations, user interactions with pages can be logged. User interaction logs can be used to evaluate user engagement with pages. For example, a system can be configured to log information such as how a user arrived at a particular page (e.g., by navigating a tree, clicking a link on another page, clicking on a search result, etc.), how the user interacted with the page (e.g., dwell time (how long the user viewed the page), whether the user edited the page, whether the user commented on the page, etc.), and/or subsequent actions taken by the user. For example, a subsequent action can be the user navigating back to a set of search results and clicking on another search result after viewing a page. These are merely examples, and it will be appreciated that different and/or additional information can be collected. In some implementations, user interaction data can be captured using, for example, JavaScript code that records information such as scrolling, clicking, navigation, etc. In some implementations, user interaction data can be obtained from server logs, which may include, for example, records of pages accessed by a user, pages edited by the user, comments a user left on a page, and so forth. In some implementations, a system can be configured to analyze information in one or more databases to determine, for example, page edits, page comments, etc. In some implementations, user interaction code can execute in a web browser engine, which can include a JavaScript engine. In some implementations, different sources of information can be used alone. In some implementations, information from different sources can be used together.

As described herein, the rich information available to a productivity platform (e.g., organizational information, page properties, user information, etc.) can be used to improve search results when users search for information within a productivity platform.

A user can be a member of one or more teams. The behavior of other users who are members of the same team or teams can be useful for identifying relevant pages. For example, if a user is a member of a backend engineering team, it can be likely that they are interested in similar information as other members of the backend engineering team. For example, a user may be interested in pages that were recently viewed, edited, commented on, or created by other members of their team. In some implementations, such information can be used to determine weights for different pages. For example, pages that were recently interacted with by other members of a team can be given higher weight when a user on that team performs a search.

An individual user's activity can also be a strong indicator of which results are most relevant to the user. For example, a user's recently visited pages, recently edited pages, recently commented pages, and recently created pages can be significant indicators of what pages or kinds of pages a user is interested in. In some cases, a user may be searching for a page that they have recently interacted with. In some cases, a user may be searching for a page that is similar to a page they have recently interacted with. Different users within an organization may have different usage patterns. For example, project managers may frequently access meeting notes, calendar events, and the like, while engineers may more frequently access technical documents, or administrative professionals may more frequently access information such as company policies. In some implementations, the search approaches herein can return search results that are more suited to particular users, for example, based at least in part on the user's own interaction history, team interaction history, and/or job role interaction history.

In some implementations, a system can be configured to collect interaction data and assemble a judgment list that can be used to gauge search result relevance. The judgment list can be implemented as a data store that includes information related to queries (e.g., the queries themselves or identifiers for the queries), pages (e.g., an identifier of a page that was retrieved for the query), a relevancy metric (e.g., an indication of how relevant the retrieved page was to the user), and so forth.

In some implementations, the judgment list can be created by mining engagement data, which can be used to approximate relevancy of a document. For example, if a user interacts with a document in a meaningful way, it can be concluded in some implementations that the document was likely relevant to the user. Meaningful interaction can include, for example, clicks the user made within the document, edits the user made to the document, how long the user spent viewing the document, or any other events.

In some implementations, a system can collect search results returned for specific queries. In some implementations, the engagement data and the search results can be joined to produce a training dataset. In some implementations, a ranking model can be trained and optimized to rank search results according to their relevancy. In some implementations, the ranking model can be trained using gradient boosting (e.g., XGBoost). In some implementations, the ranking model can be deployed on a local system. In some implementations, the ranking model can be deployed to a third-party model serving platform.

In some implementations, engagement data can be used to compute an engagement score. In some implementations, engagement scores can be binary. For example, the engagement score can be zero if user interaction is below a threshold amount (e.g., the user did not dwell on the page for more than a threshold amount of time, did not scroll the page more than a threshold amount, did not edit the page, did not comment on the page, etc.). In some embodiments, the engagement score can be one if the user interaction is at or above the threshold amount. It will be appreciated that thresholds can vary for different pages, different searches, etc. For example, minimum scrolling and/or dwell time can depend on a length of the page. Scrolling can depend on the resolution of a display used by a user to view the page (e.g., if a user is using a high-resolution display, more content may be able to fit on the screen, thus reducing the need to scroll to view all the content on a page).

In some implementations, pairwise losses can be used. For example, pairs of pages can be generated for all the pages included in a set of search results, and the pages within each pair can be labeled to indicate a relative relevance of the page compared to the other page in the pair. A model can then be trained so as to minimize a difference between the true relative ranking and the predicted relative ranking.

In some implementations, an entire set of search results and their relative rankings (for example, based at least in part on engagement scores) can be used to train a ranking model, and the ranking model can be tuned to minimize a difference between the true relative rankings, which can be labels associated with each search result of the set of search results, and predicted relative rankings.

In some implementations, when a user submits a search string, a system can be configured to retrieve information about the user, such as pages that the user has recently interacted with. The system can use the user information to augment the search string provided by the user. For example, the system can include indications of pages recently interacted with by the user as part of the search query that is sent to a search engine, which can cause the search engine to give higher weight to those pages or otherwise increase the likelihood that those pages appear in the search results returned to the user. In some implementations, such user information may not be used during a retrieval step.

In some implementations, when a user enters a search string, a system can be configured to retrieve information about the user. The user information can be used to, for example, compute one or more features that can be used by a ranking model to help identify pages that are relevant to the user. The user information can include, for example, teams or groups, job role, location, etc. In some implementations, the user information can include access permissions, which can indicate which pages, teamspaces, etc., a user has access to. In some implementations, access can be based on a user's membership in one or more groups or teams.

In some implementations, the system can be configured to enrich the results with additional computed features. In some implementations, the system can pass the results to a ranking model. In some implementations, the ranking model can process the results to identify the most relevant results. In some implementations, the system can return the results to the user. In some implementations, the system can provide a ranked list of results to the user. In some implementations, the system may not return all results to the user. For example, in some implementations, the system can be configured to return only the top N (where N is a positive integer) results to the user—for example, the top 5 results, top 10 results, top 20 results, top 50 results, top 100 results, etc.

As described herein, various features can be important for identifying relevant search results. For example, in some implementations, features can include editing information, such as last edit time, edit frequency, or whether or not the user performing the search was the last user to edit the page or edited the page recently. In some implementations, page title can be a significant feature. For example, if the page title matches some or all of the keywords in a search query, the page may be more likely to be relevant to the user's search. This can be the case especially, for example, when a user performs a fairly specific search. For example, a search for "2024 Company Holidays" can be specific enough that a page that includes words such as "2024" and "Holidays" can be highly likely to contain the information the user is looking for.

In some implementations, search result ranking can be based at least in part on the similarity between a search string and page titles. For example, if a user searches for "2024 Firm Holidays" and there is a page with the exact title "2024 Firm Holidays" or a very similar title such as "Firm Holidays—2024," it can be likely that such a page contains the information the user is looking for. However, typical search algorithms may not necessarily identify such pages as being the most relevant pages for a search.

In some implementations, a model can be configured to generate vector representations of page titles. In some embodiments, the model can compute a vector representation of a search string or a part of a search string. In some implementations, a system can be configured to compute a similarity between a search string vector and a page title vector. The similarity can be, for example, Manhattan distance, Euclidean distance, cosine similarity, or Levenshtein distance. Various other similarity metrics can be used alternatively or additionally.

In some implementations, the similarity between a search string and a title can be fed into a ranking model and can be used in ranking results. For example, pages with titles having high similarity to a search string can generally be ranked more highly in search results than pages having titles that are dissimilar to the search string. In some implementations, a similarity can be determined without generating vector representations. For example, the Levenshtein distance between a search string and a page title can be calculated. In some implementations, page titles and search strings can be modified prior to performing comparison operations, for example, by removing articles such as "a," "an," and "the" from the search string and page titles.

While page title and search string similarity can be a significant indicator of a page's relevance to a particular query, page title alone is generally not sufficient. For example, a user may be searching for specific information that is contained in a page but which is not part of the page title. Continuing with the holiday example, an employee may want to find out if Jul. 5, 2024, which falls on a Friday, will be treated as a holiday. The user could search for "July 4" in an effort to find a page that indicates whether or not July 5 is also being treated as a holiday. However, there likely is no page with "July 4" in the title, and if there is, it may be likely that the page is irrelevant to the user's search. For example, a page with "July 4" in the title may be more likely to contain information about a meeting held on that day than information about whether or not the day is a holiday. Thus, while page title and search string similarity can be significant, it can be important to consider other information, such as user profile information, page contents, page attributes, etc., when ranking search results.

In some implementations, the weight given to title similarity can vary, for example, based on the length of a search string. For example, in some implementations, page title similarity can be given greater weight when a user enters a relatively long search string.

In some cases, search engines can perform worse over time, providing less relevant results. This can occur for a variety of reasons. As the amount of data to be searched grows, search engines can struggle to find relevant results. New pages can be highly relevant, but if engagement is used for ranking, such pages may not appear near the top of rankings because they have had little engagement. If pages rarely or never appear at or near the top of search results, it may be difficult for them to ever gain sufficient engagement to be ranked highly because, for example, the results may be truncated such that some pages don't appear at all even if they have a nonzero match score or may appear so low in results shown to a user that the user is unlikely to ever see them. Described herein are various approaches that can be used to help improve the quality of results and ensure that relevant results are presented to users. This problem can be especially noticeable when there is a large number of pages such that users are unlikely to organically discover new pages by simply browsing a workspace or teamspace.

Page and Result Boosting

Using user interactions, user data, and so forth to rank results can have many advantages. For example, it can be easier to identify pages that are likely to be relevant to the user. However, naïve use of such information can lead to significant issues. For example, there can be biases in user interactions that can skew simple interaction data to favor pages that may not be relevant. For example, simply counting clicks to gauge relevancy can pose problems because, for example, users tend to click on the top results even if they are not relevant, and some relevant pages may never appear because they have poor engagement. In some cases, poor engagement can be driven at least in part by a page appearing lower in search results. Thus, in some cases, over time, a search engine that relies on clicks or page views alone may perform worse.

When users perform a search, there can be a large number of results that are returned. However, users typically only look at a limited number of results—for example, the top 5 results, top 10 results, top 20 results, etc. In some cases, not all relevant pages may be returned to the user. For example, in some cases, a fixed number of results can be returned, or only results with at least a minimum match score may be returned to the user. While such approaches can conserve computer resource usage (as fewer results need to be processed, sent to the user, etc.) and often are convenient for the user, who has fewer results to review, there can be significant problems with these approaches. For example, pages that fall below the minimum match score or that are otherwise excluded from presentation to the user may nonetheless be relevant to the user. As an example, such an issue can occur if a new document or type of document is added to a workspace or teamspace. The new documents may have few or no views, may lack similarity to other documents, and so forth. While new documents are one example of when relevant results might be excluded, other scenarios are possible. In general, when the results that are presented to a user are limited (or when certain pages or types of pages tend to appear lower in search results), users may rarely or never see the results for lower-ranked pages.

Users typically prioritize the top result or top few results when reviewing search results. For example, a user may click on one of the top few results even if the result is not actually relevant to the user's search simply because it appears at or near the top of the results. In some implementations, search results can be ranked, and after ranking, the ordering of the search results can be modified, for example, by shifting one or more results up or down in the ordering. This can help ensure that, at least some fraction of the time, a lower-ranked result will appear high enough in the search results presented to the user that the user is likely to see and potentially interact with the result. Such an approach can be used to better identify pages that, while lower ranked with a current ranking model, are actually more relevant to the user's query. This information can be used to improve a ranking model so that pages that are relevant to the user appear higher in the search results.

In some implementations, results can be retrieved and ranked as described herein, and results that would otherwise be excluded can be included in the search results that are presented to the user. For example, one or more pages that have a nonzero match score (e.g., at least one word in a search query appears on the page) can be included in the search results that are presented to the user. In some implementations, a system can be configured to retrieve one or more pages for inclusion in the search results and can insert the one or more pages at insertion points within a listing of ranked search results. In some implementations, the insertion points can be chosen at random. In some implementations, the insertion points can be chosen based on an algorithm. For example, it may be desirable to include an otherwise excluded search result near the top of the search results (e.g., as the top result, within the top three results, within the top five results, within the top ten results, etc.) to increase the likelihood that the user sees the search result. In some implementations, no additional search results may be inserted into the ranked list of search results. In some implementations, a fixed number of additional search results can be inserted into the ranked list of search results. In some implementations, the number of additional results to be inserted can be based at least in part on the number of search results to be displayed to the user. For example, a system may be configured such that a fixed percentage (e.g., 1%, 5%, 10%, or any other percentage) of all the results presented to the user are additional results.

While the term "page" has been used herein, it will be appreciated that search results are not strictly limited to pages. Rather, search results can include pages, blocks within pages, databases, files (e.g., PDF files, video files, audio files, image files, word processing files, spreadsheets, emails, calendar events, etc.), etc.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient trans-formation and changes to rendering logic and is useful for collaboration.

Blocks can be nested inside of other blocks (e.g., infinitely nested subpages inside of pages). The content attribute of a block stores the array of block IDs (or pointers) referencing those nested blocks. Each block defines the position and order in which its content blocks are rendered. This hierar-chical relationship between blocks and their render children is referred to herein as a "render tree." In one example, page blocks display their content in a new page instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title and checked: [["No"]]). The client builds operations to represent the creation of a new block with those attributes. New blocks are not created in isolation: blocks are also added to their parent's content array so they are in the correct position in the content tree. As such, the client also generates an operation to do so. All these individual change operations are grouped into a transaction. Then, the client applies the operations in the transaction to its local state. New block objects are created in memory, and existing blocks are modified. In native apps, the model caches all records that are accessed locally in an LRU (least recently used) cache on top of SQLite or IndexedDB, referred to as "RecordCache." When records are changed on a native app, the model also updates the local copies in RecordCache. The editor re-renders to draw the newly created block onto the display. At the same time, the transaction is saved into Transaction-Queue, the part of the client responsible for sending all transactions to the model's servers so that the data is persisted and shared with collaborators. TransactionQueue stores transactions safely in IndexedDB or SQLite (depend-ing on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then, the model uses both "before" and "after" data to validate the changes for per-missions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to mem-bers of a teamspace. Every client can have a long-lived WebSocket connection to the MessageStore. When the client renders a block (or page or any other kind of record), the client subscribes to changes of that record from Message-Store using the WebSocket connection. When a team mem-ber opens the same page, the member is subscribed to changes of all those blocks. After changes have been made through the saveTransactions process, the API notifies Mes-sageStore of newly recorded versions. MessageStore finds client connections subscribed to those changing records and passes on the new version through their WebSocket connec-tion. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as "loadPageChunk"; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or subpages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a subheading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100 or an embedding of a block in the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto-filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks, and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or, more simply, "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online web pages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder) or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger dataset. For example, a dataset may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger dataset and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as "training." Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed, and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture) unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
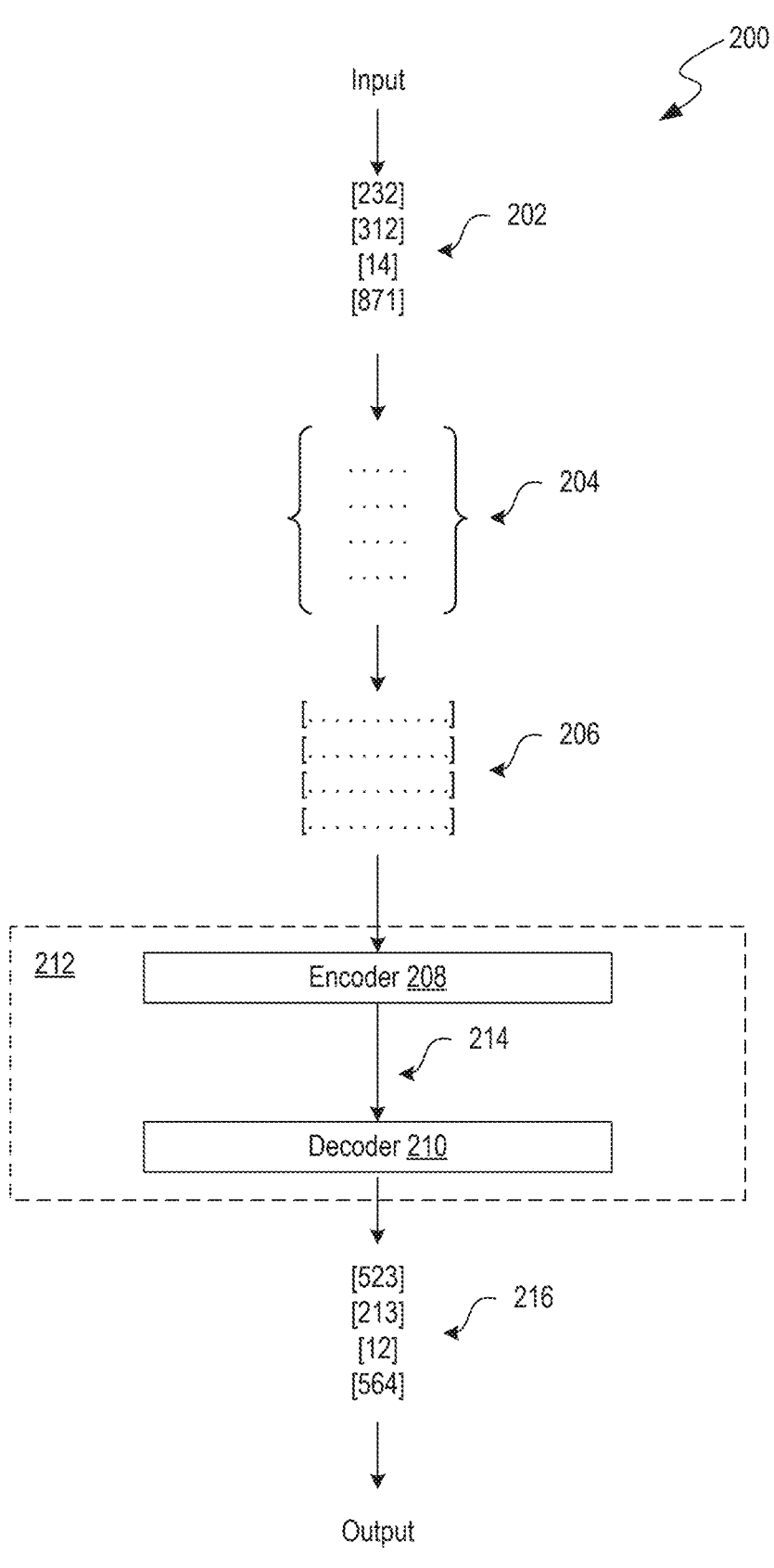
FIG. 2 is a block diagram of an example transformer.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on input formats other than natural language input. For example, the input can include objects, images, audio content, video content, or a combination thereof.

The transformer 212 can be trained on a text corpus that is labeled (e.g., annotated to indicate verbs and nouns) or unlabeled. LLMs can be trained on a large unlabeled corpus. The term "language model," as used herein, can include an ML-based language model (e.g., a language model that is implemented using a neural network or other ML architecture) unless stated otherwise. Some LLMs can be trained on a large multi-language, multi-domain corpus to enable the model to be versatile at a variety of language-based tasks, such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as "tokens" (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list or a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a "latent space" or "feature space."

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user, and the output can include a high-level summary of the meeting notes. In other examples, the input provided to the transformer includes a question or a request to generate text. The output can include a response to the question, text associated with the request, or a list of ideas associated with the request. For example, the input can include the question, "What is the weather like in San Francisco?" and the output can include a description of the weather in San Francisco. As another example, the input can include a request to brainstorm names for a flower shop, and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a "prompt," which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a "zero-shot prompt."

Hierarchical Organizational Blocks in a Workspace

Figure 3:
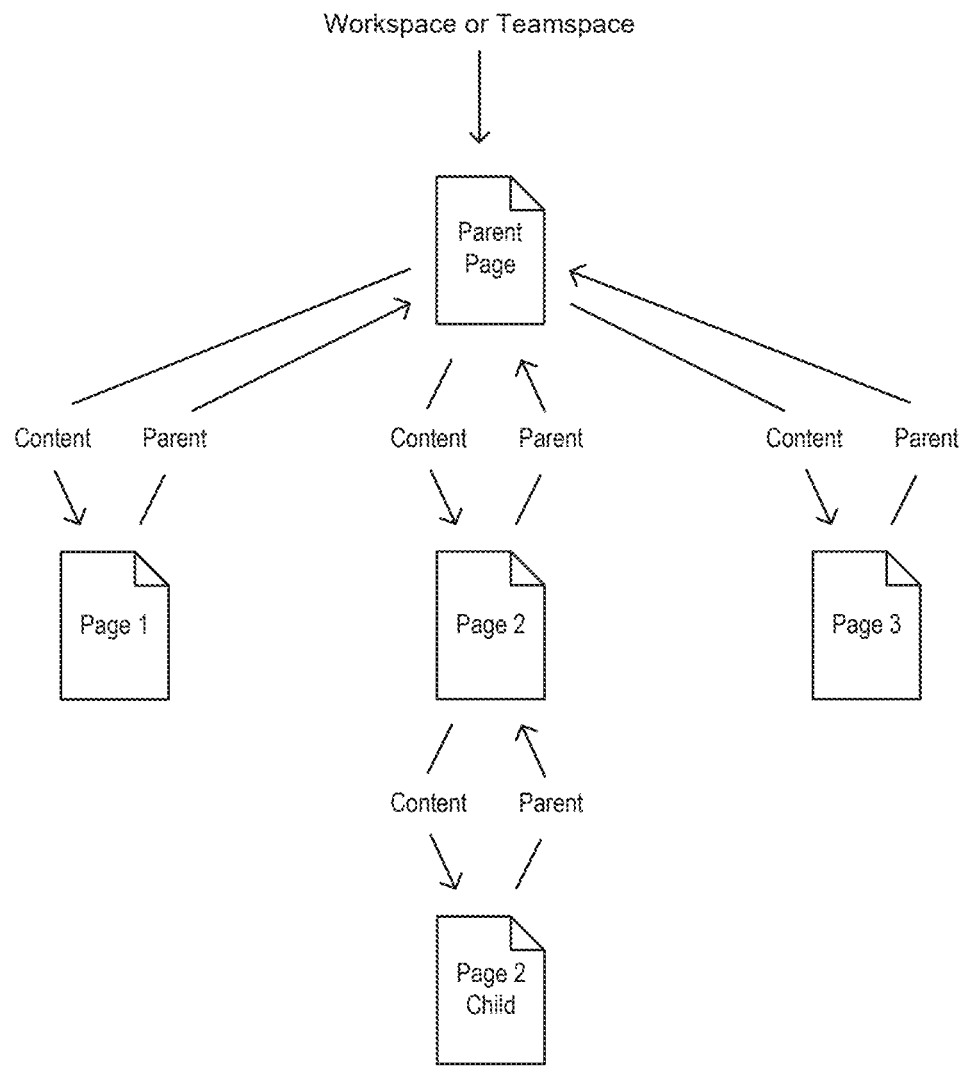
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children, while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet, while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Example Embodiments

Figure 4:
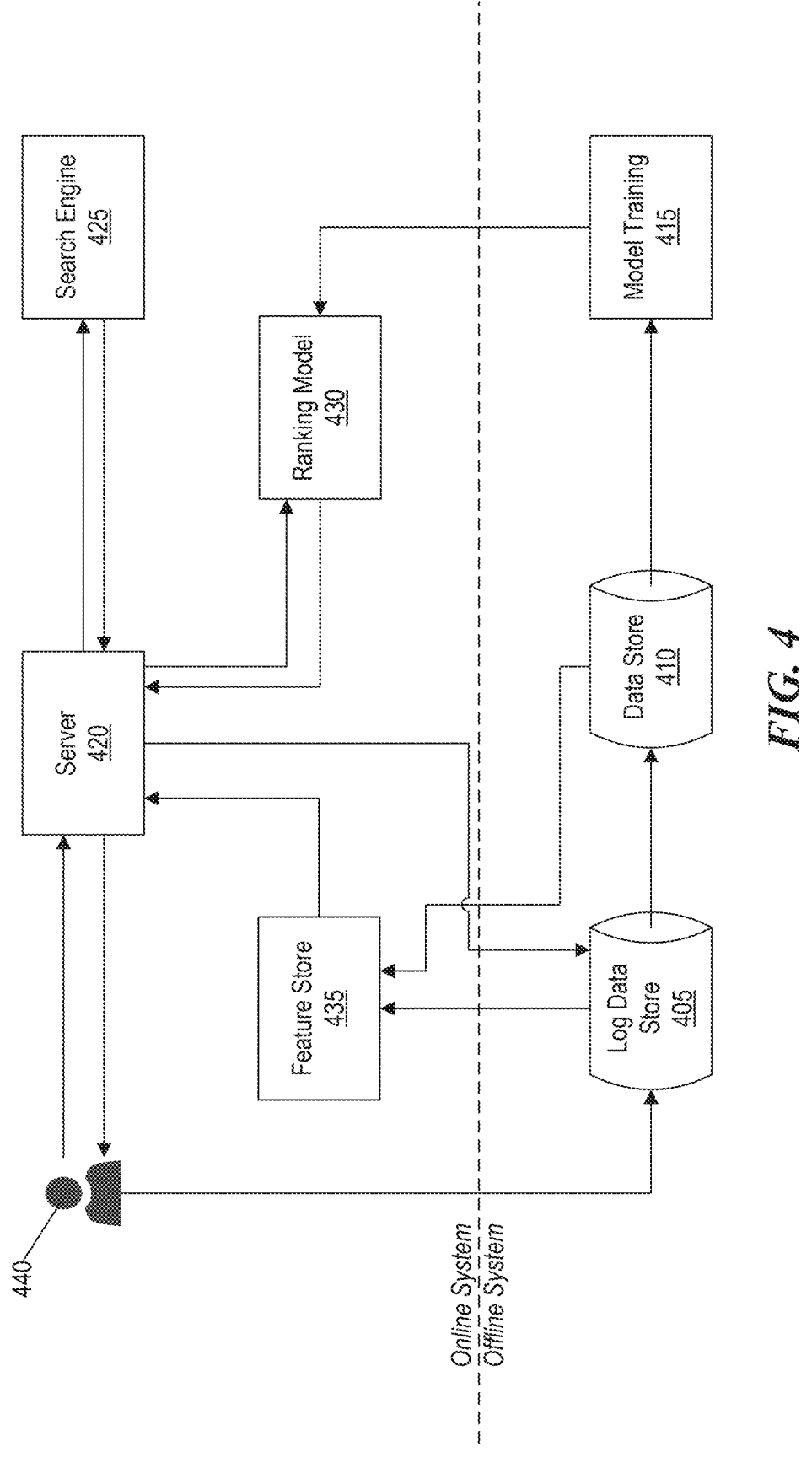
FIG. 4 is a block diagram that illustrates various components of a search system according to some implementations.

FIG. 4 is a block diagram that illustrates various components of a search system according to some implementations. As shown in FIG. 4, in some implementations, the search system can be divided into two pieces: an offline system and an online system. The offline system and the online system can be in communication with each other. The offline system can generally relate to model training, while the online system can generally relate to model deployment. The offline system and online system can, in some implementations, be different systems. In some implementations, the offline system and online system can be the same system. In some implementations, different components may be operated on different systems. For example, in some implementations, a ranking model can be deployed on a different system and/or a search engine can be deployed on a different system. The search system can include a log data store 405, data store 410, model training module 415, server 420, search engine 425, ranking model 430, and feature store 435. It will be appreciated that the specific configuration shown in FIG. 4 can be departed from while still being consistent with this disclosure. The components of the search system can be embodied in one server or in multiple servers, which may be in the same location or different locations.

The log data store 405 can store information relating to user interactions with a system. For example, the log data store 405 can store user information, query information, page title information, page edit information, page comment information, page view information, dwell time, other log information, or any combination thereof. Information from the log data store 405 can be used to populate the data store 410. The data store 410 can store information used for training a machine learning model. The model training module 415 can be configured to train the ranking model 430.

The data store 410 and the log data store 405 can store large volumes of information, not all of which may be used when the ranking model 430 is deployed. In some implementations, performance of a system can be improved by storing information used for retrieving search results, ranking search results, or both in the store 435. Accessing information in the store 435 can be faster than accessing information stored in the log data store 405 or the data store 410.

When a user 440 issues a search request to the server 420, the server 420 can retrieve some information about the user, for example, from the store 435. The server 420 can combine the search request and the retrieved user information to generate a query. The server 420 can send the query to the search engine 425, which can return one or more search results. As described herein, the search results returned by the search engine 425 may not be ranked in an optimal way for the user 440. The search results can be provided to the ranking model along with features from the feature store 435. For example, the server 420 can retrieve page features from the feature store 435 for pages included in the search results. The server 420 can pass the features from the feature store 435 and the search results to the ranking model 430, which can re-rank the search results, for example, to generate a rank-ordered listing of search results. The server 420 can receive the rank-ordered listing of search results from the ranking model 430 and present them to the user 440. In some implementations, the ranking model 430 can be implemented on a model serving platform that is different from the server 420.

Figure 5:
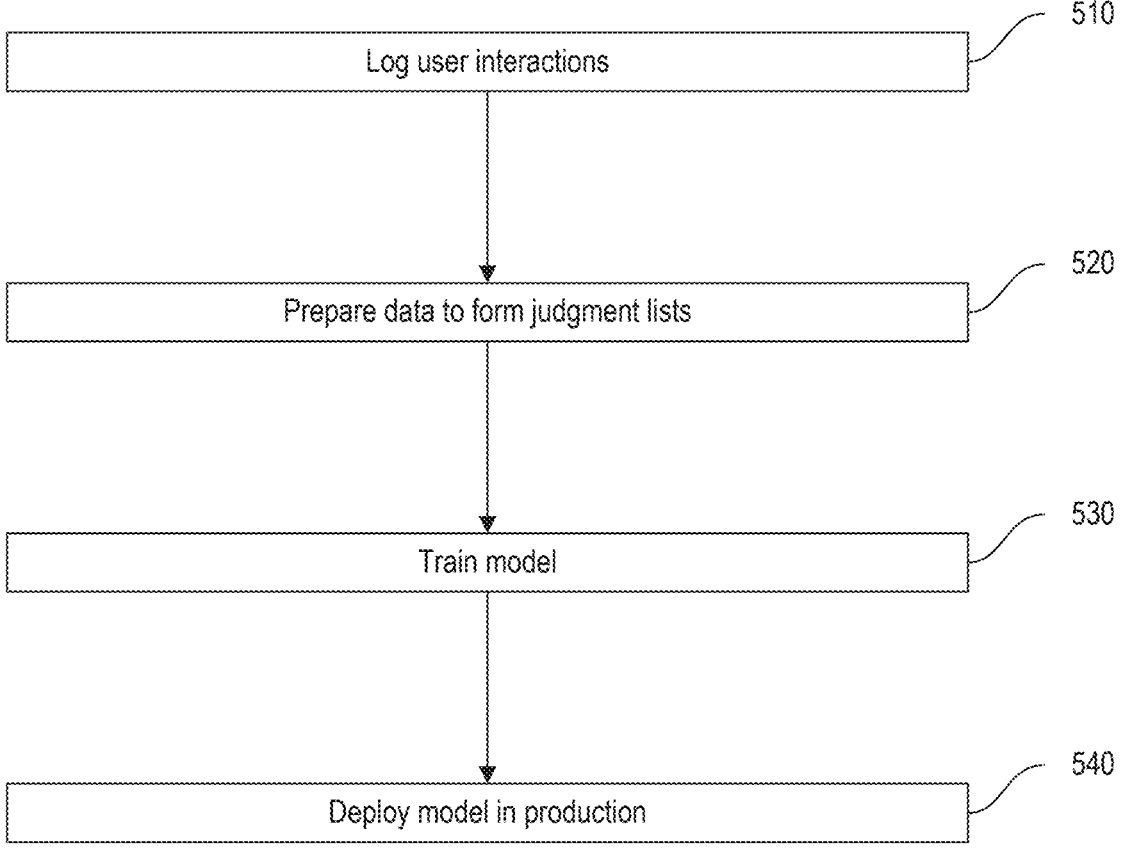
FIG. 5 is a flowchart that illustrates an example process for training a ranking model according to some implementations.

FIG. 5 is a flowchart that illustrates an example process for training a ranking model according to some implementations. The process illustrated in FIG. 5 can be performed by a computer system or by multiple computer systems (generally referred to as "system").

At operation 510, the system can log user interactions, such as page clicks, dwell times, page edits, page comments, and so forth. In some implementations, logging user interactions can include logging search strings submitted by users. At operation 520, the system can prepare the logged user interaction data to form judgment lists. At operation 530, the system can train the ranking model using the judgment lists. At operation 540, the system can deploy the model, thereby making the ranking model available for use.

Figure 6:
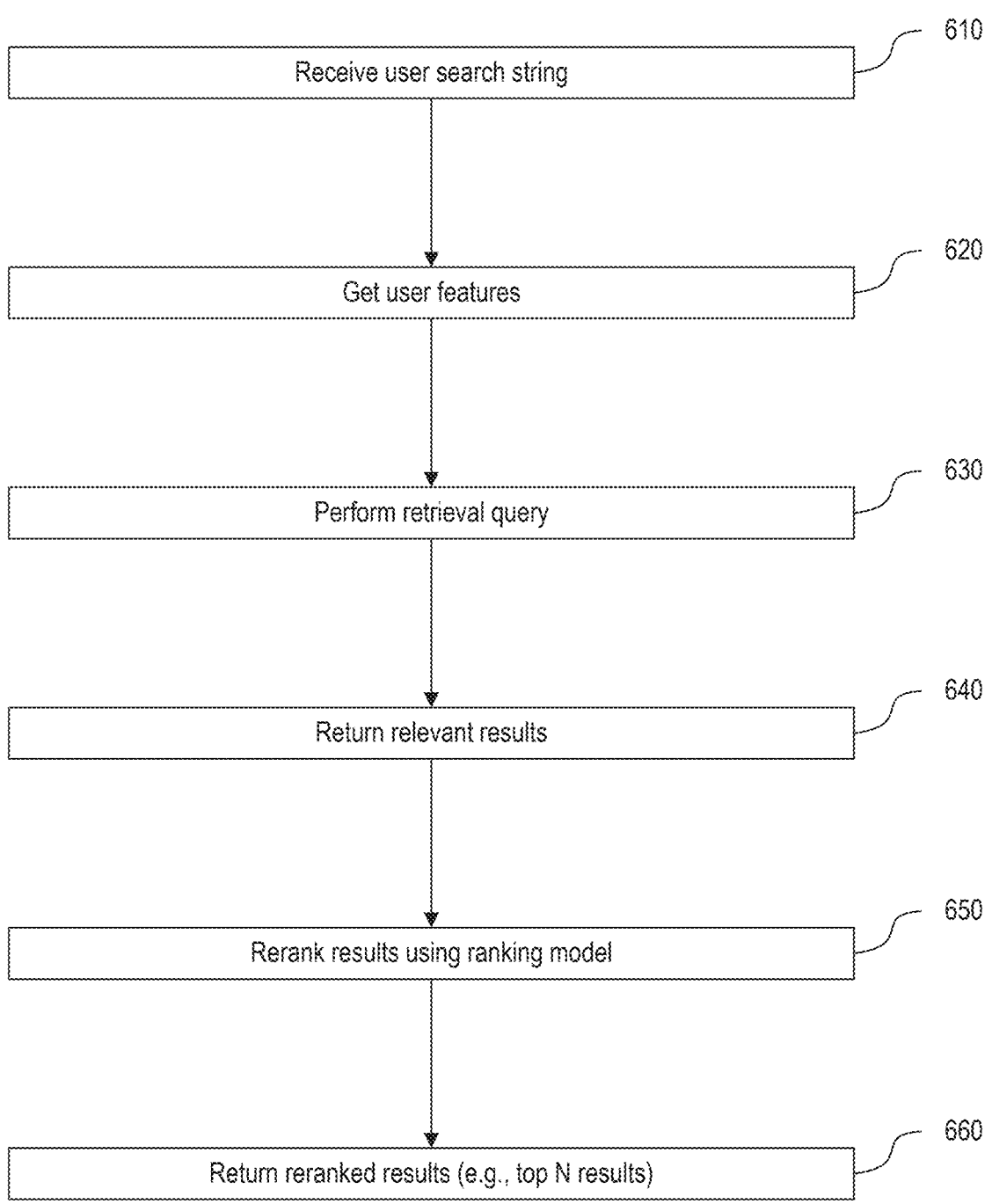
FIG. 6 is a flowchart that illustrates an example process for retrieving and ranking search results according to some implementations.

FIG. 6 is a flowchart that illustrates an example process for retrieving and ranking search results according to some implementations. The process illustrated in FIG. 6 can performed by one or more computer systems (generally, "system").

At operation 610, the system can receive a search string from a user. At operation 620, the system can retrieve one or more user features—for example, recently visited pages. At operation 630, the system can perform a retrieval query. The retrieval query can be, for example, submitted to a search engine. The retrieval query can include the search string and, in some cases, can be the same as the search string. In some implementations, the retrieval query can include the search string as well as certain user information. For example, information about recently visited pages can be included in the retrieval query to cause the search engine to have a higher likelihood of including recently visited pages in the search results. For example, recently visited pages can be boosted so that they are more likely to have a high match score. At operation 640, the search engine can return relevant results. At operation 650, the system can re-rank the results using a results model, for example, as described herein. In some implementations, prior to the re-ranking, a subset of N search results can be selected, e.g., the top N search results selected from the relevant results, and only the top N results may undergo re-ranking. At operation 660, the system can return the top N relevant results to the user.

Figure 7:
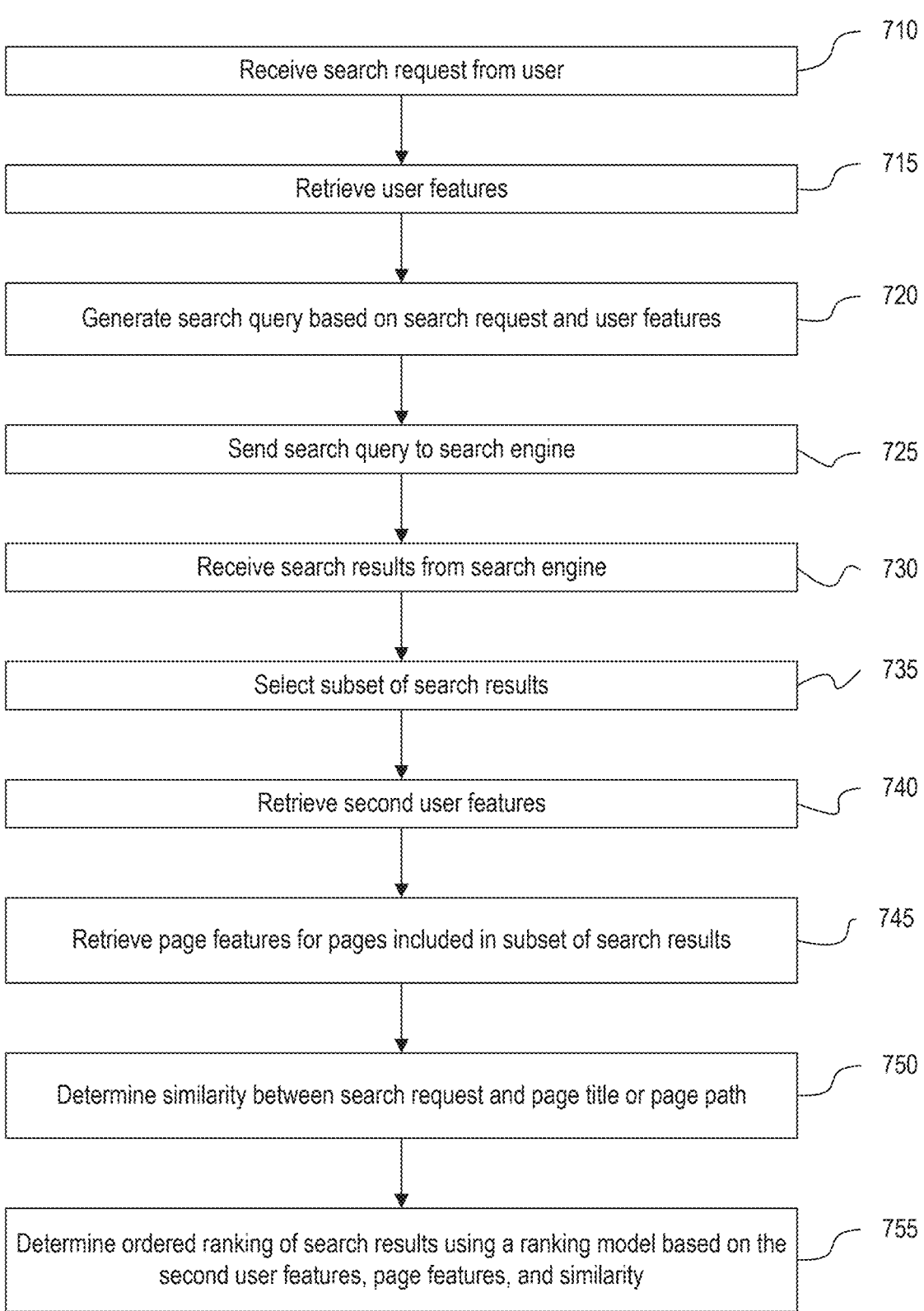
FIG. 7 is a flowchart that illustrates an example process for retrieving and ranking search results according to some implementations.

FIG. 7 is a flowchart that illustrates an example process for retrieving and ranking search results according to some implementations. The process illustrated in FIG. 7 can be performed by a computer system or by multiple computer systems acting together (generally referred to as "system").

At operation 710, the system can receive a search request from a user. The search request can include a search string. At operation 715, the system can retrieve one or more user features—for example, one or more pages recently interacted with (e.g., viewed, edited, commented, or created) by the user. At operation 720, the system can generate a search query based on the search request and the user features. At operation 725, the system can send the search query to a search engine. At operation 730, the system can receive wise obtain search results from the search engine. At operation 735, the system can select a subset of the search results—for example, the top N search results, where N is a positive integer. In some cases, all search results can be included in the subset. At operation 740, the system can retrieve additional user features. At operation 745, the system can retrieve page features for pages included in the subset. At operation 750, the system can determine a similarity between the search request and the page title or page path of each page included in the subset. At operation 755, the system can determine an ordered ranking of search results using a ranking model based at least in part on the similarity between the search query and the page titles or page paths.

Figure 8:
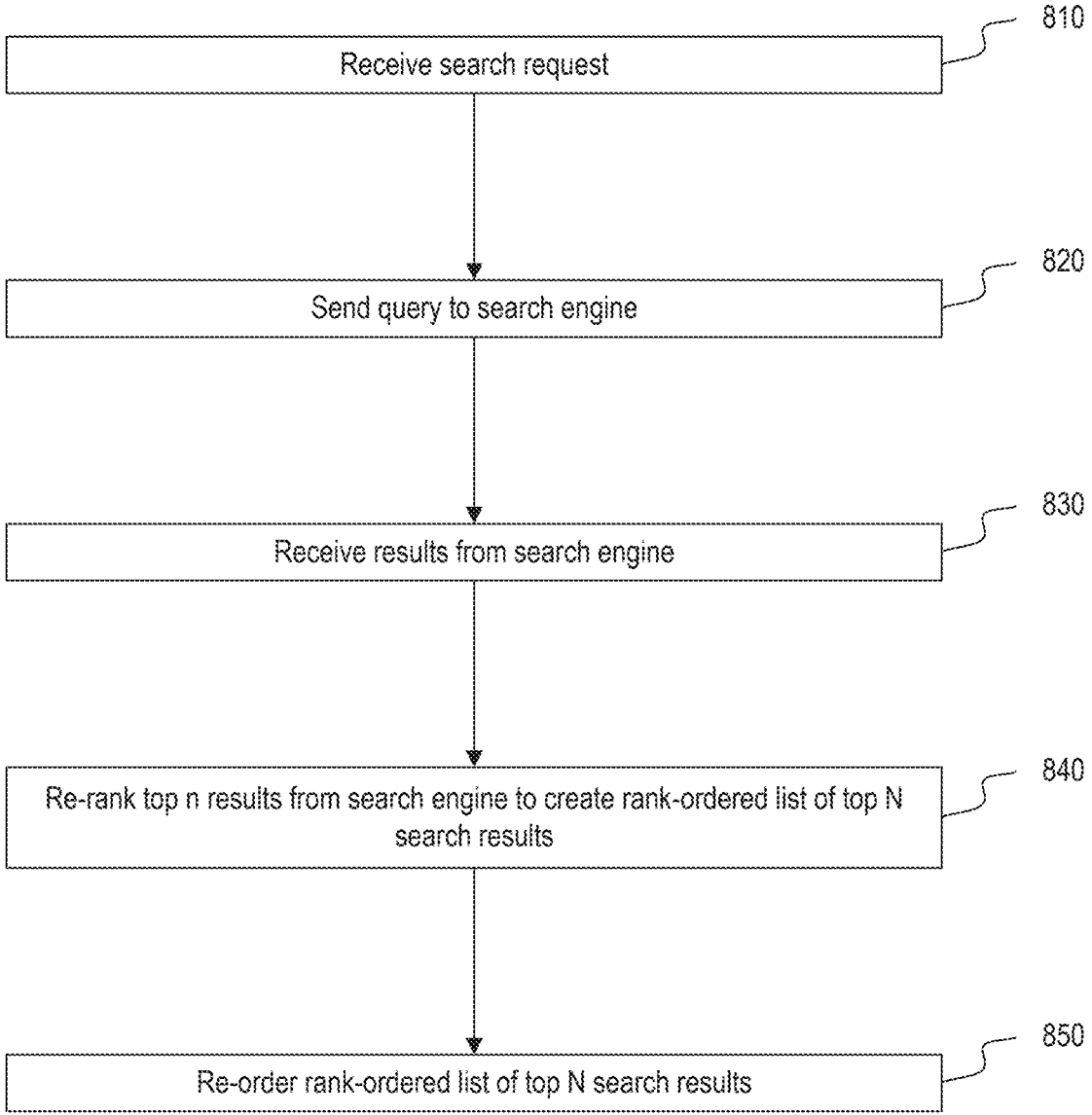
FIG. 8 is a flowchart that illustrates an example process for reordering a ranked list of search results according to some implementations.

FIG. 8 is a flowchart that illustrates an example process for reordering a ranked list of search results according to some implementations. The process illustrated in FIG. 8 can performed by a computer system or by multiple computer systems (generally referred to as "system").

At operation 810, the system can receive a search request. The search request can include a search string. At operation 820, the system can send a query to a search engine, the query based at least in part on the search string. At operation 830, the system can receive search results from the search engine. At operation 840, the system can re-rank the search results to create a rank-ordered list of the top N search results. At operation 850, the system can reorder the rank-ordered list by moving at least one search result to a different position in the rank-ordered list. For example, reordering can include moving a search result from a lower position to a higher position in the search results such that a user may be more likely to see and potentially interact with the search result. For example, a lower-ranked search result can be placed in the top position, within the top three positions, within the top five positions, within the top ten positions, etc.

Figure 9:
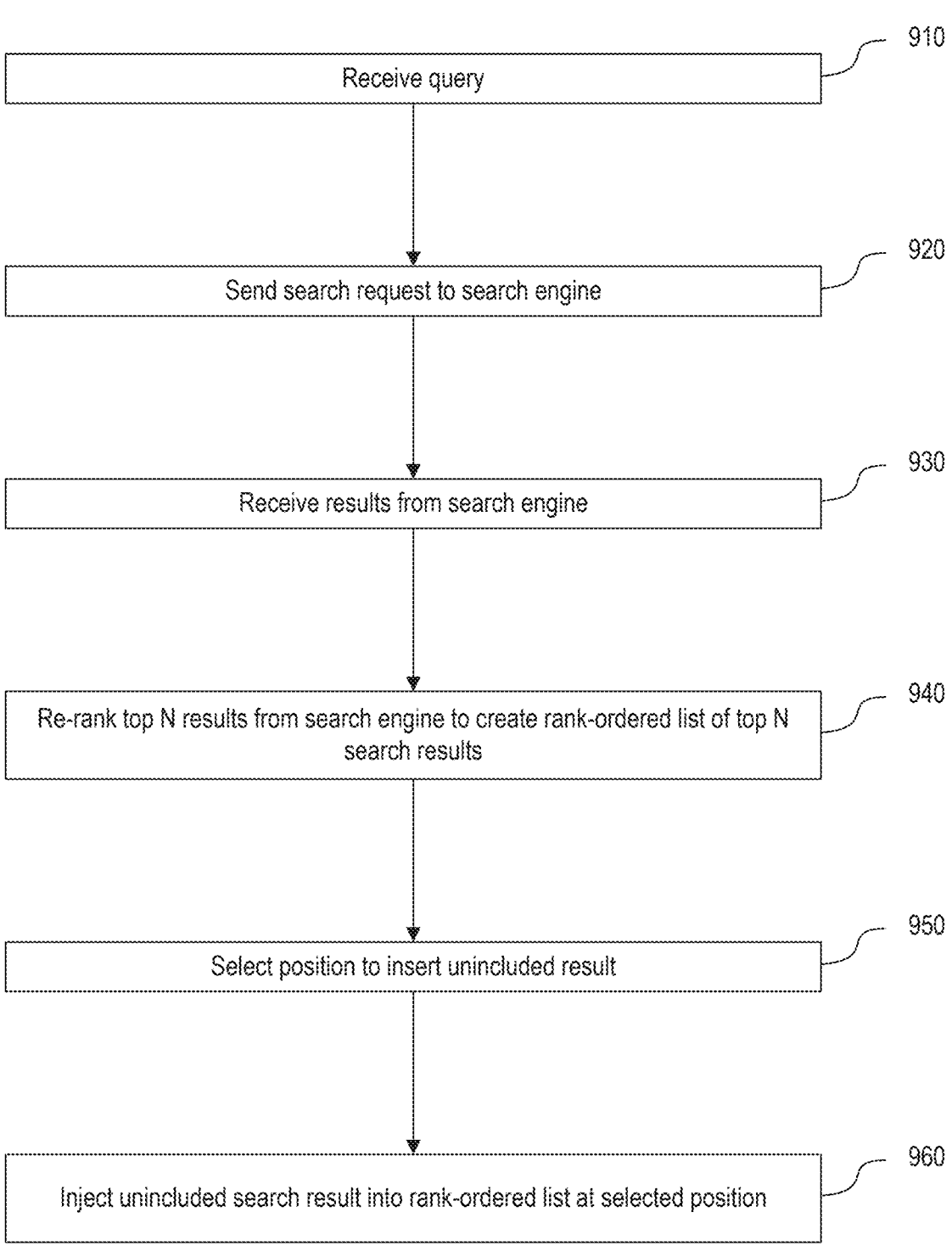
FIG. 9 is a flowchart that illustrates an example process for inserting additional search results into a list of search results according to some implementations.

FIG. 9 is a flowchart that illustrates an example process for inserting additional search results into a list of search results according to some implementations. The process illustrated in FIG. 9 can be performed on one or more computer systems (generally, "system").

At operation 910, the system can receive a search request from a user. The search request can include a search string. At operation 920, the system can send a search query to a search engine. The search query can be based at least in part on the search string. The search query can include additional information, such as information about pages recently interacted with by the user, information about teamspaces or workspaces to which the user has access, and so forth. At operation 930, the system can receive search results from the search engine. At operation 940, the system can, using a ranking model, for example, a ranking model as described herein, re-rank the search results. In some implementations, not all results may be re-ranked. For example, in some implementations, only the top N results may be re-ranked. At operation 950, the system can select a position to insert an additional result. At operation 960, the system can insert the additional result at the selected position. In some implementations, multiple additional results can be injected at multiple positions. In some embodiments, one or more search results can be removed such that the total number of search results displayed to a user is unchanged because of the insertion of additional search results. For example, in some implementations, one or more search results at the bottom of the results (e.g., the lowest-ranked results) can be removed.

Figure 10:
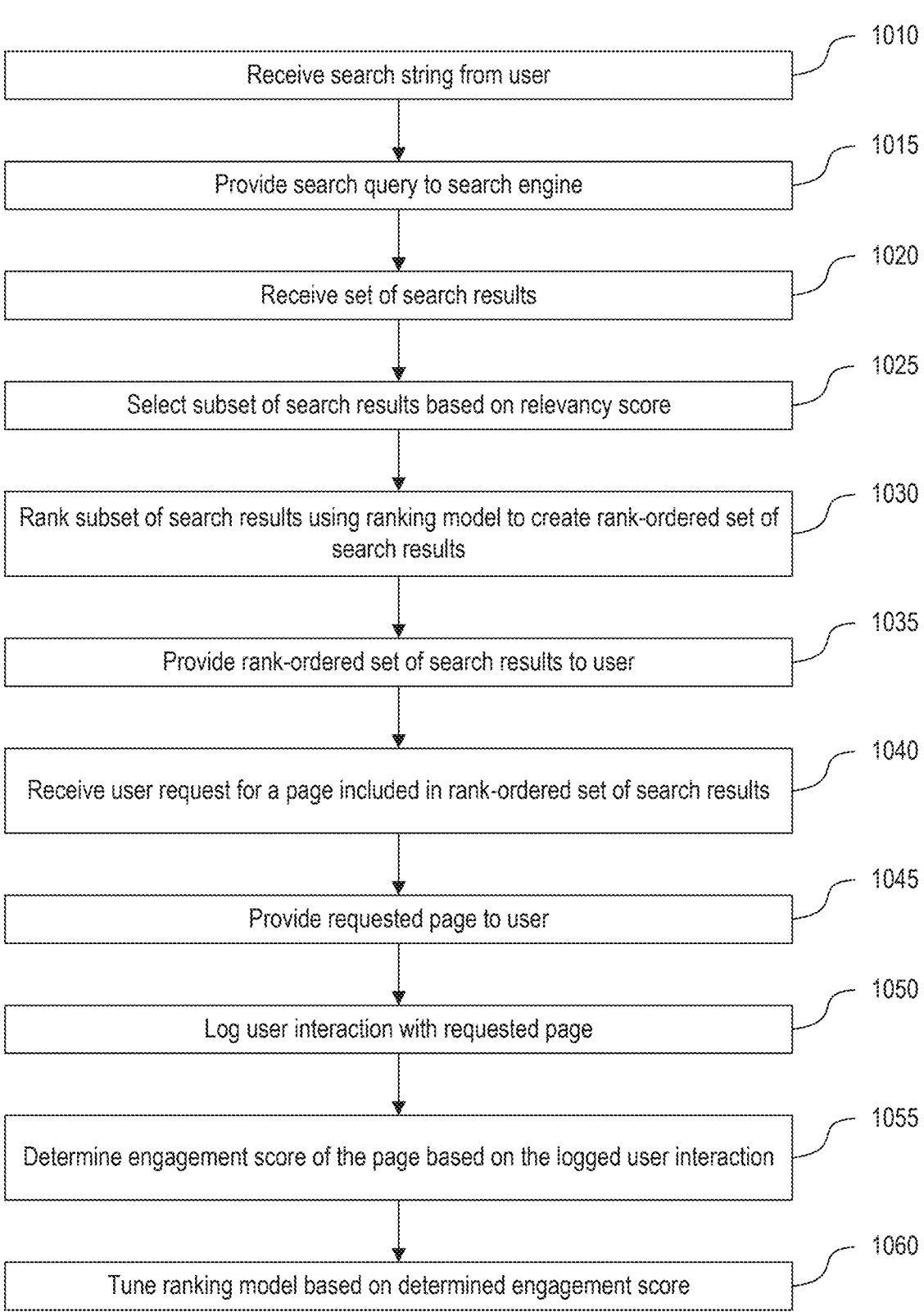
FIG. 10 is a flowchart that illustrates an example process for tuning a ranking model according to some implementations.

FIG. 10 is a flowchart that illustrates an example process for tuning a ranking model according to some implementations. The process illustrated in FIG. 10 can be performed on one or more computer systems (generally, "system").

At operation 1010, the system can receive a search string from a user. At operation 1015, the system can provide a search query to a search engine. The search query can be based on the search string. In some implementations, the search query can include the search string. In some implementations, the search query can include additional information, such as information about a user's access, page view history, page edit history, page comment history, etc. At operation 1020, the system can receive a set of search results from the search engine. At operation 1025, the system can select a subset of search results based on, for example, match scores included in the search results. In some implementations, the subset of search results can include all search results, the top N search results (where N is a positive integer, for example, 10, 20, 30, 40, 50, 100, or any other positive integer number). At operation 1030, the system can rank the subset of search results using a ranking model, for example, as described herein.

At operation 1035, the system can provide the rank-ordered search results to the user. The user can review the search results and select a search result. At operation 1040, the system can receive a user request for a page included in the rank-ordered search results. At operation 1045, the system can provide the requested page to the user. At operation 1050, the system can log user interaction with the requested page. For example, the system can log dwell time, scrolling, commenting, editing, and so forth. At operation 1055, the system can determine an engagement score for the requested page based at least in part on the logged user interaction with the page. At operation 1060, the system can tune the ranking model based on the determined engagement score.

In some implementations, the ranking model can undergo continuous training, being updated as users conduct searches and new user interaction data is obtained. In some implementations, the ranking model can be trained periodically or on an ad hoc basis.

Figure 11:
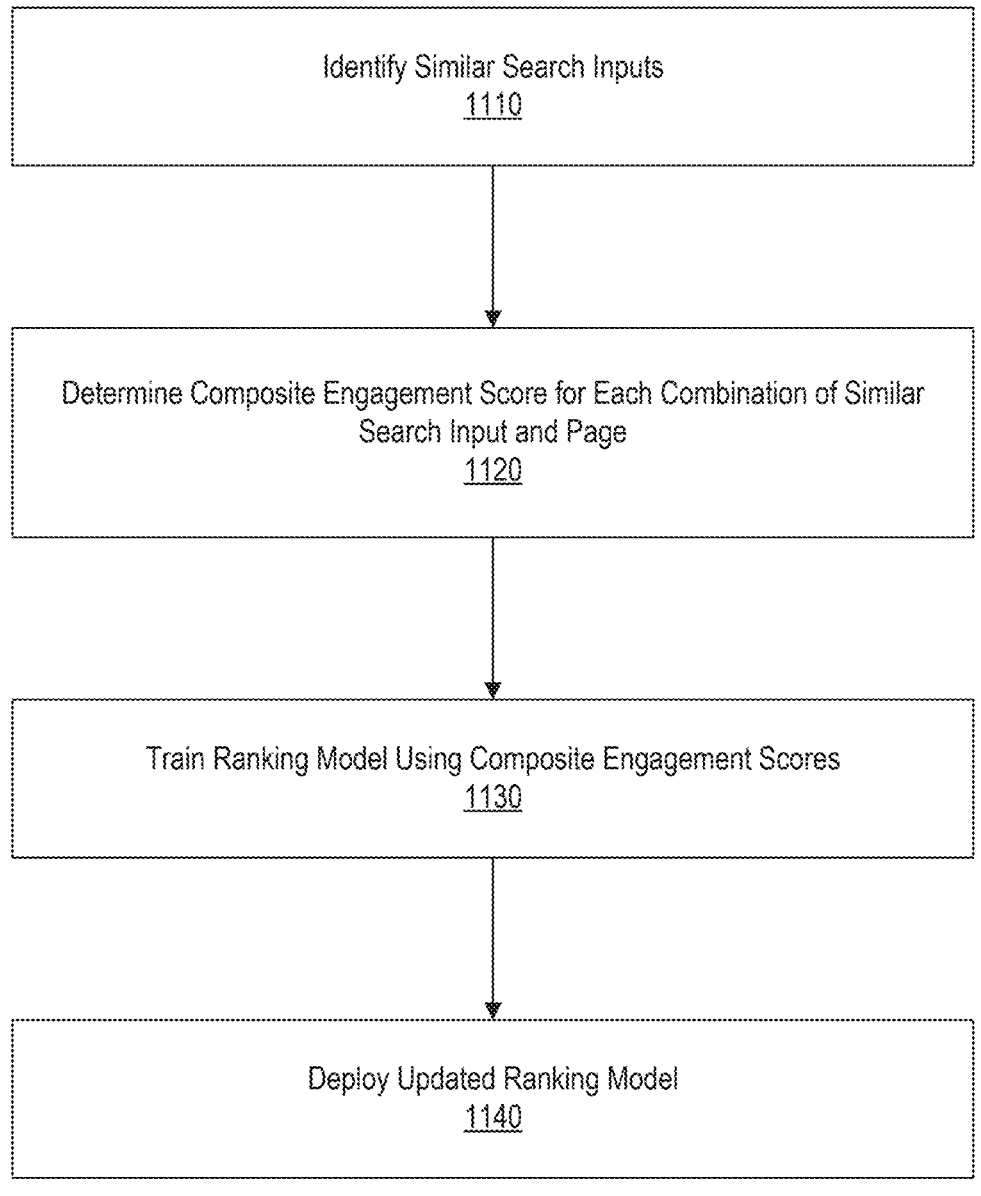
FIG. 11 is a flowchart that illustrates an example process for tuning a ranking model based on engagement scores according to some implementations.

FIG. 11 is a flowchart that illustrates an example process for tuning a ranking model based on engagement scores according to some implementations. The process shown in FIG. 11 can be run on one or more computer systems (generally, "system"). In some implementations, engagement scores can be associated with particular search inputs and particular pages. These associations can be important because different pages may be relevant for different search inputs. For example, if a user searches for "food" and clicks on a page about pasta and another user searches for "cities" and clicks on a page for New York, the fact that the other user engaged meaningfully with the New York page provides little or no value for determining what pages are relevant to an inquiry about food. However, it can be important to group similar queries together. For example, if each query is considered entirely individual, there may be few identical search inputs, which could make engagement scores of limited value. However, similar queries likely should return similar results. For example, a user who searches for "day trips from NYC" and another user who searches for "weekend trips from NYC" may be likely to be searching for similar kinds of information, and pages that are relevant to the first query for day trips are likely also relevant for the second query for weekend trips. As another example, "vacation policy" and "time off policies" should likely return similar results. Thus, in some implementations, queries can be grouped based on similarity.

At operation 1110, the system can identify similar search inputs. At operation 1120, for each combination of similar search input and page, the system can determine a composite engagement score. The composite engagement score can be, for example, an average engagement score. At operation 1130, the system can retrain the ranking model using the composite engagement scores. At operation 1140, the system can deploy the updated ranking model.

Figure 12:
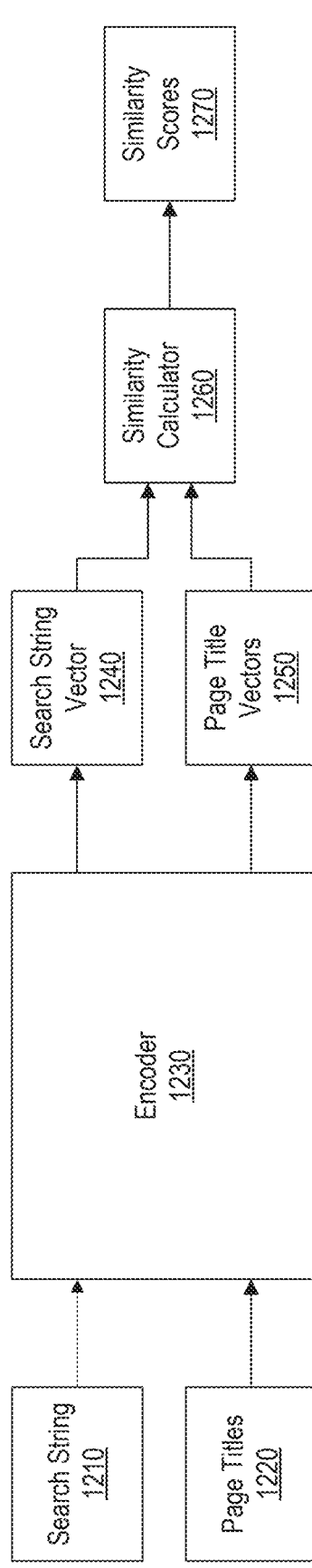
FIG. 12 is a block diagram that illustrates an example of computing similarity scores according to some implementations.

FIG. 12 is a block diagram that illustrates an example of computing similarity scores according to some implementations. An encoder 1230 can be configured to receive input data and to output a vector representation of the input data. For example, the encoder 1230 can receive a search string 1210 and output a search string vector 1240. The encoder 1230 can receive a plurality of page titles 1220 (e.g., search result page titles) and generate a plurality of page title vectors 1250. A similarity calculator 1260 can receive the search string vector 1240 and the page title vectors 1250 and can output a plurality of similarity scores 1270 between the search string vector 1240 and each of the plurality of page title vectors 1250.

In some implementations, an encoder may not be used. For example, a system can be configured to compute a difference between the search string and each page title of a plurality of page titles. For example, in some implementations, the system can compute Levenshtein distances between a search string and page titles.

The similarity scores 1270 can be provided to a ranking model and can be used when determining ranking of pages included in a set of search results.

Figure 13:
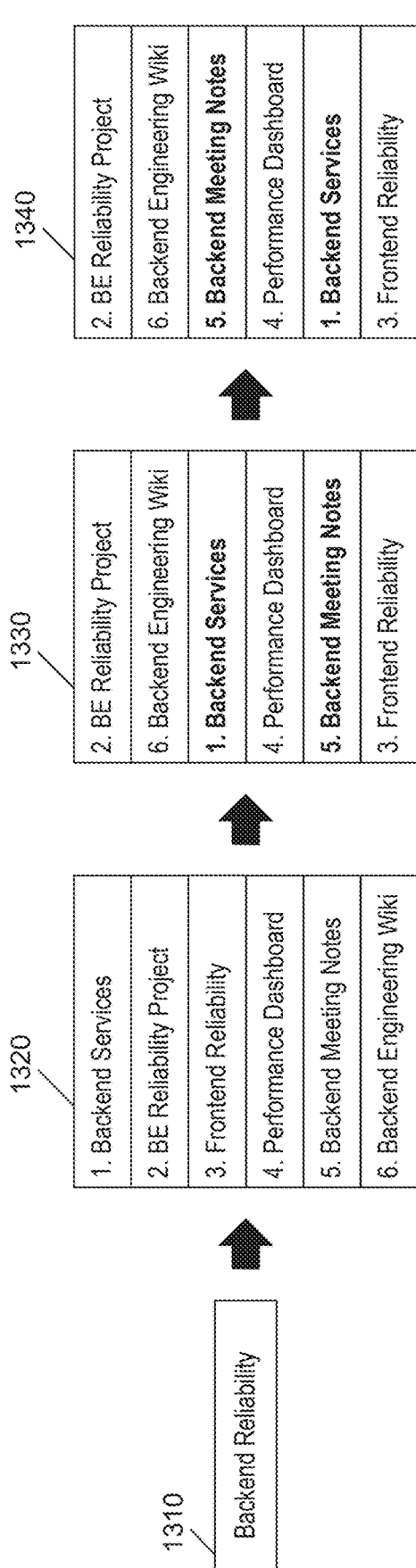
FIG. 13 is a drawing that schematically illustrates altering search result ranking according to some implementations.

FIG. 13 is a drawing that schematically illustrates altering search result ranking according to some implementations. A user can submit a search input 1310. During a retrieval step, a search engine can return search results 1320. A ranking model can re-rank the search results 1320 to produce ranked search results 1330. The ranked search results can be reordered to produce reordered search results 1340. In FIG. 13, the third result ("Backend Services") and the fifth search result ("Backend Meeting Notes") are swapped. In some implementations, results can swap positions. In some implementations, positions may not be swapped. For example, "Backend Meeting Notes" could be moved from position five to position three without altering the ordering of other search results (e.g., in the example, "Backend Services" would move down to position four when "Backend Meeting Notes" is inserted at position three). It will be appreciated that multiple results can be reordered in some implementations.

Figure 14:
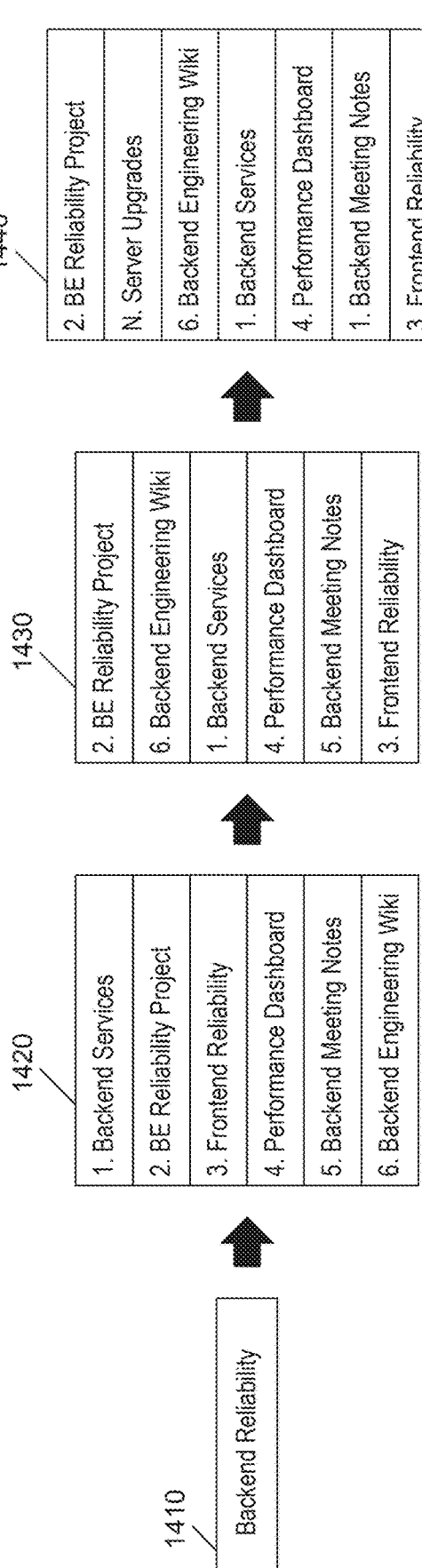
FIG. 14 is a drawing that schematically illustrates inserting an additional search result into a set of search results according to some implementations.

FIG. 14 is a drawing that schematically illustrates inserting an additional search result into a set of search results according to some implementations. The additional search result can be a search result that was not included in the set of search results, for example, because it had a low match score or otherwise did not rank within the set of results returned to a user.

A user can submit a search input 1410. During a retrieval step, a search engine can return a set of results 1420. A ranking model can receive the search of results 1420 and rank them to produce ranked search results 1430. A system can modify the search results by selecting a result that was not included in the ranked search results 1430. In the example of FIG. 14, six search results were included in the ranked search results 1430. The system can select an additional search result, which can be any search result without regard to its relevancy (provided it has a nonzero relevancy) and can insert the result into the ranked search results 1430 to produce a new set of search results 1440 that can be displayed to the user. The additional search result can be inserted at any position within the ranked search results 1430. However, as described herein, users often only look at the top result or the top few results. Thus, in some implementations, the additional search result can be inserted at a position near the top of the ranked search results 1430, for example, as the first result, within the first three results, within the first five results, etc. In some implementations, the position can be predetermined (e.g., the additional result can be inserted at a specified, predetermined position within the search results, for example, in position two or position three). However, a fixed position for inserting additional results may result in inaccurate engagement measurements, as the likelihood of user interaction with a search result can vary based on position. In some implementations, an insertion position can be chosen at random, for example, using a random number generator. The random number generator can output a position with a defined range of positions.

Computer System

Figure 15:
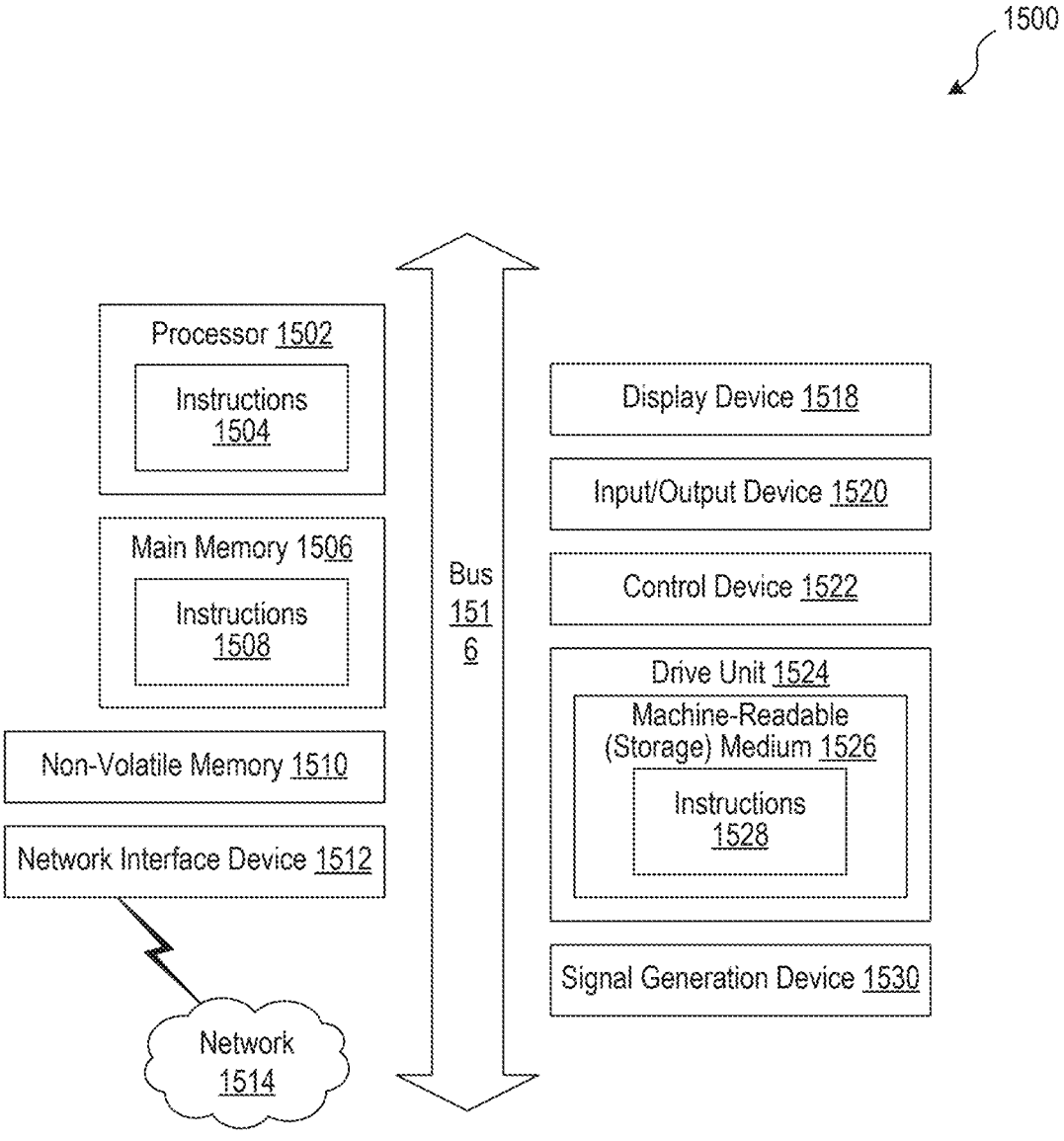
FIG. 15 is a block diagram that illustrates an example of a computer system in which at least some operations described herein can be implemented.

FIG. 15 is a block diagram that illustrates an example of a computer system 1500 in which at least some operations described herein can be implemented. As shown, the computer system 1500 can include one or more processors 1502, main memory 1506, non-volatile memory 1510, a network interface device 1512, a display device 1518, an input/output device 1520, a control device 1522 (e.g., keyboard and pointing device), a drive unit 1524 that includes a machine-readable (storage) medium 1526, and a signal generation device 1530 that are communicatively connected to a bus 1516. The bus 1516 represents one or more physical buses and/or point-to-point connections that are connected by appropriate bridges, adapters, or controllers. Various common components (e.g., cache memory) are omitted from FIG. 15 for brevity. Instead, the computer system 1500 is intended to illustrate a hardware device on which components illustrated or described relative to the examples of the figures and any other components described in this specification can be implemented.

The computer system 1500 can take any suitable physical form. For example, the computer system 1500 can share a similar architecture as that of a server computer, personal computer (PC), tablet computer, mobile telephone, wearable electronic device, network-connected ("smart") device (e.g., a television or home assistant device), AR/VR system (e.g., head-mounted display), or any electronic device capable of executing a set of instructions that specify action(s) to be taken by the computer system 1500. In some implementations, the computer system 1500 can be an embedded computer system, a system-on-chip (SOC), a single-board computer (SBC) system, or a distributed system such as a mesh of computer systems or include one or more cloud components in one or more networks. Where appropriate, one or more computer systems 1500 can perform operations in real time, near real time, or batch mode.

The network interface device 1512 enables the computer system 1500 to mediate data in a network 1514 with an entity that is external to the computer system 1500 through any communication protocol supported by the computer system 1500 and the external entity. Examples of the network interface device 1512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1506, non-volatile memory 1510, machine-readable medium 1526) can be local, remote, or distributed. Although shown as a single medium, the machine-readable medium 1526 can include multiple media (e.g., a centralized/distributed database and/or associated caches and servers) that store one or more sets of instructions 1528. The machine-readable medium 1526 can include any medium that is capable of storing, encoding, or carrying a set of instructions for execution by the computer system 1500. The machine-readable medium 1526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1504, 1508, 1528) set at various times in various memory and storage devices in computing device(s). When read and executed by the processor 1502, the instruction(s) cause the computer system 1500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variant thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties except for any subject matter disclaimers or disavowals and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A computer-implemented method for determining user engagement quality, the computer-implemented method comprising:
  receiving a search request comprising a search string from a user;
  generating a retrieval query based at least in part on the search string;
  providing the retrieval query to a search engine;
  receiving a set of search results from the search engine, each search result corresponding to a page;
  ranking search results of the set of search results using a ranking model to generate a set of ranked search results,
    wherein the ranking model is configured to rank the search results of the set of search results based at least in part on an engagement score, wherein the engagement score is based on at least three of: dwell time, page edit, page comment, scrolling, back navigation, forward navigation, or subsequent searching,
    wherein dwell time indicates a length of time a page associated with a selected search result was viewed,
    wherein page edit indicates if the page was edited,
    wherein page comment indicates whether a comment was left on the page,
    wherein scrolling indicates whether a viewer of the page scrolled the page,
    wherein back navigation indicates if a user navigated back to the set of ranked search results,
    wherein forward navigation indicates whether a user navigated to another page, and
    wherein subsequent searching indicates whether a user performed another search after viewing the selected search result;
  providing the set of ranked search results to the user;
  receiving a request from the user for a page included in the set of ranked search results;
  providing, in response to the request, the page to the user;
  monitoring user interaction information, wherein the user interaction information comprises at least three of: dwell time, page edit, page comment, scrolling, back navigation, forward navigation, or subsequent searching;
  determining, based on at least a portion of the user interaction information, an updated engagement score; and
  storing, in a non-volatile computer-readable storage medium, the updated engagement score,
    wherein the engagement score is associated with the page,
    wherein the engagement score is associated with the search string, and
    wherein the ranking model is configured to be trained based at least in part on the engagement score.

2. The computer-implemented method of claim 1, further comprising:
  retraining the ranking model using the updated engagement score,
  wherein retraining the ranking model comprises adjusted one or more weights of the ranking model.

3. A computer-implemented method for determining user engagement quality, the computer-implemented method comprising:
  accessing a set of search results responsive to a search requested by a user,
    wherein each search result of the set of search results corresponds to a page,
    wherein the search results are determined by executing a retrieval query based at least in part on a search string submitted by the user;
  ranking each search result of the set of search results using a ranking model to generate a set of rank-ordered search results,
    wherein the ranking model is configured to rank the search results based at least in part on an engagement score determined based on first user interaction data indicating user interaction with each corresponding page,
    wherein the first user interaction data is based on one or more of: page edit or page comment;
  providing the set of rank-ordered search results to the user;
  receiving a request from the user for a page included in the set of rank-ordered search results;
  providing, in response to the request, the page to the user;

monitoring user interaction with the page to collect second user interaction data; and determining, based on the second user interaction data, a second engagement score, wherein the engagement score and the second engagement score are associated with the page, wherein the engagement score and the second engagement score are associated with a search string included in the search requested by the user, and wherein the ranking model is configured to be trained based at least in part on the engagement score.

4. The computer-implemented method of claim 3, further comprising, prior to access the set of search results:

receiving a search string from the user;

generating the retrieval query for a search engine based at least in part on the search string; and provided the retrieval query to the search engine to cause the search engine to return the set of search results.

5. The computer-implemented method of claim 3, wherein the page comprises computer-executable code configured to capture at least a portion of the second user interaction data, and wherein the computer-executable code is configured to run on a computer system operated by the user.

6. The computer-implemented method of claim 3, wherein monitoring user interaction comprises accessing data in one or more server logs of a server, wherein the server is configured to provide the page to the user, wherein the server is configured to receive data provided by the user.

7. The computer-implemented method of claim 3, further comprising training the ranking model, wherein training the ranking model comprises adjusting one or more weights of the ranking model based at least in part on engagement scores.

8. The computer-implemented method of claim 7, wherein training the ranking model comprises:

generating pairs of pages included in the set of search results;

assigning labels to each pair in each pair of pages, the labels indicating which page of each pair of pages has a higher engagement score, the assigned labels indicating a true relative ranking of the pages of each pair of pages; and minimizing a difference between the true relative ranking and a predicted relative ranking.

9. The computer-implemented method of claim 7, wherein training the ranking model comprises:

assigning labels to pages included in the set of search results, the labels indicating relative engagement scores of the pages, the labels indicating a true relative ranking of the pages in the set of search results; and minimizing a difference between the true relative ranking and a predicted ranking.

10. The computer-implemented method of claim 3, wherein the engagement score is a binary score, wherein the engagement score is zero if the second user interaction data indicates less that a threshold amount of engagement with the page, wherein the engagement score is one if the second user interaction data indicates at less the threshold amount of engagement with the page.

11. The computer-implemented method of claim 10, further comprising:

updating the engagement score, wherein updating the engagement score comprises adding the second engagement score to the engagement score.

12. A system for determining user engagement quality comprising:

at least one processor; and a non-volatile, computer-readable storage medium having instructions stored thereon that, when executed by the at least one processor, cause the system to:

accessing a set of search results responsive to a search requested by a user, wherein each search result of the set of search results corresponds to a page, wherein the search results are determined by executing a retrieval query based at least in part on a search string submitted by the user;

ranking each search result of the set of search results using a ranking model to generate a set of rank-ordered search results, wherein the ranking model is configured to rank the search results based at least in part on an engagement score determined based on first user interaction data indicating user interaction with each corresponding page, wherein the first user interaction data is based on one or more of: page edit or page comment;

providing the set of rank-ordered search results to the user;

receiving a request from the user for a page included in the set of rank-ordered search results;

providing, in response to the request, the page to the user;

monitoring user interaction with the page to collect second user interaction data; and determining, based on the second user interaction data, a second engagement score, wherein the engagement score and second engagement score are associated with the page, wherein the engagement score and second engagement score associated with a search string included in the search requested by the user, and wherein the ranking model is configured to be trained based at least in part on the engagement score.

13. The system of claim 12, wherein the instructions further cause the system to, prior to accessing the set of search results:

receive a search string from the user;

generate the retrieval query for a search engine based at least in part on the search string; and provide the retrieval query to the search engine to cause the search engine to return the set of search results.

14. The system of claim 12, wherein the page comprises computer-executable code configured to capture at least a portion of the second user interaction data, and wherein the computer-executable code is configured to run on a computer system operated by the user.

15. The system of claim 12, wherein monitoring user interaction comprises accessing data in one or more server logs of a server, wherein the server is configured to provide the page to the user, wherein the server is configured to receive data provided by the user.

16. The system of claim 12, wherein the instructions are further configured to:

train the ranking model, wherein training the ranking model comprises adjusting one or more weights of the ranking model based at least in part on engagement scores.

17. The system of claim 16, wherein training the ranking model comprises:

generating pairs of pages included in the set of search results;

assigning labels to each pair in each pair of pages, the labels indicating which page of each pair of pages has a higher engagement score, the assigned labels indicating a true relative ranking of the pages of each pair of pages; and minimizing a difference between the true relative ranking and a predicted relative ranking.

18. The system of claim 16, wherein training the ranking model comprises:

assigning labels to pages included in the set of search results, the labels indicating relative engagement scores of the pages, the labels indicating a true relative ranking of the pages in the set of search results; and minimizing a difference between the true relative ranking and a predicted ranking.

19. The system of claim 12, wherein the engagement score is a binary score, wherein the engagement score is zero if the second user interaction data indicates less that a threshold amount of engagement with the page, wherein the engagement score is one if the second user interaction data indicates at less the threshold amount of engagement with the page.

20. The system of claim 19, wherein the instructions further cause the system to:

update the engagement score, wherein updating the engagement score comprises adding the second engagement score to the engagement score.

* * * * *